3,471,349
METHOD OF CONSTRUCTING A POSITIVE EXPULSION TANK
Edward A. Cohen, Roselle, Robert H. Bosworth, Morristown, and Robert E. Feucht, Upper Saddle River, N.J., assignors to The Bendix Corporation, a corporation of Delaware
Continuation of application Ser. No. 516,873, Dec. 28, 1965. This application Sept. 6, 1966, Ser. No. 577,529
Int. Cl. B32b 31/06
U.S. Cl. 156—155                        3 Claims

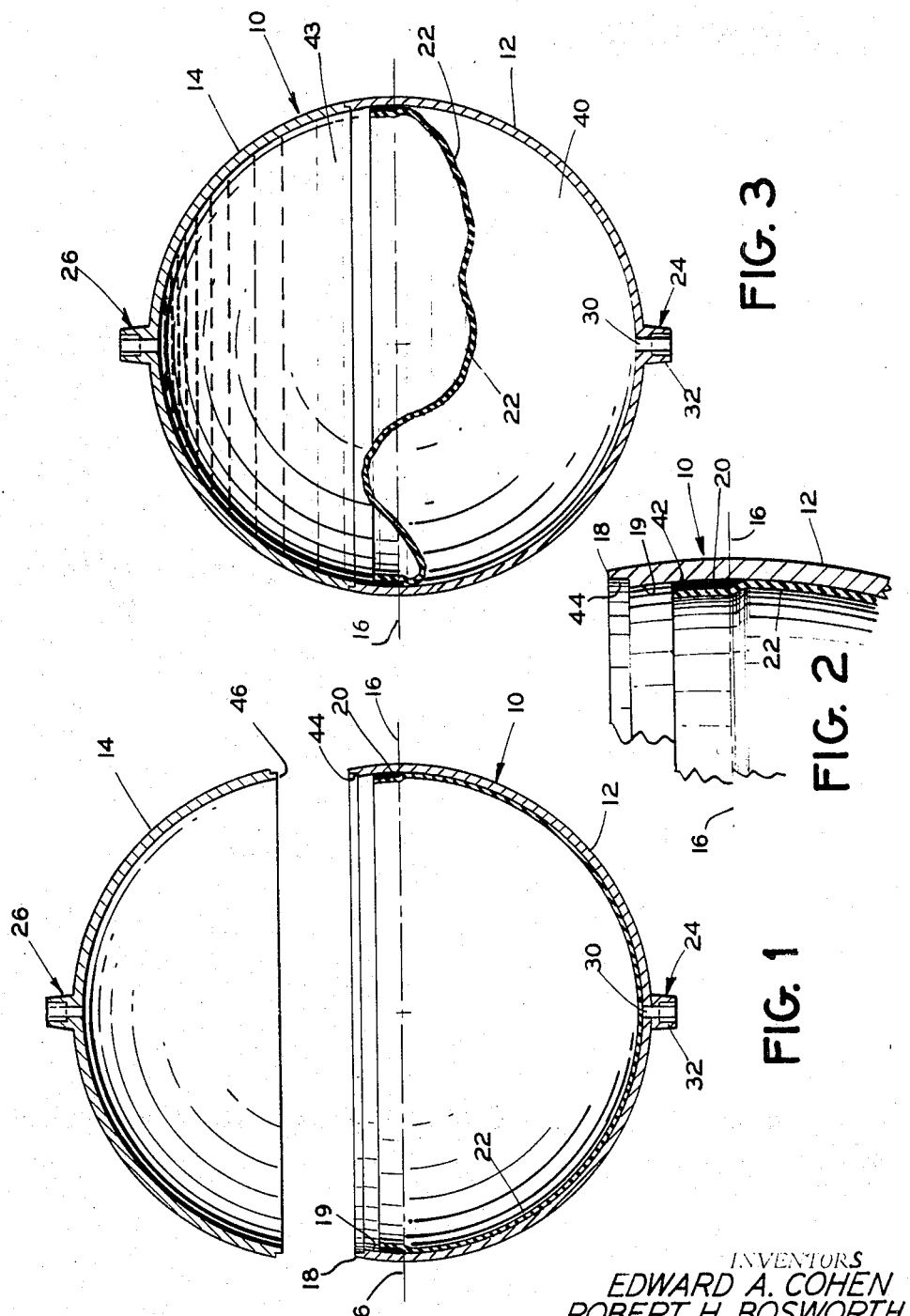
INVENTORS
EDWARD A. COHEN
ROBERT H. BOSWORTH
ROBERT E. FEUCHT
Constantine A. Michalos
ATTORNEY United States Patent Office 3,471,349
Patented Oct. 7, 1969

ABSTRACT OF THE DISCLOSURE

A method of constructing a positive expulsion tank including a bladder formed on a segment of the tank by spraying a suitable bladder material on an inner surface of the tank segment with a band of a bonding material along an inner surface thereof, curing the sprayed bladder material on the inner surface of the tank segment, separating the cured bladder material from the interior surface of the tank segment to form a bladder having an edge surface retained by the band of bonding material at the inner surface of the tank segment, and forming an enclosed storage tank having a pair of chambers separated by the bladder.

This application is a continuation of U.S. application Ser. No. 516,873 filed Dec. 28, 1965 by Edward A. Cohen, Robert H. Bosworth and Robert E. Feucht, and assigned to The Bendix Corporation and relates generally to a method of constructing a positive expulsion tank for storage of propellants in zero gravity surroundings and more particularly to a method of forming a bladder within a metallic storage tank whereby the internal tank surface can be used as a molding form for the fabrication of the bladder and in the final support of the bladder in the storage of propellant therein.

Frequently it is desirable to use a liquid storage tank which may be discharged in any attitude. One of the lightest designs is one in which a compressed gas is used to displace the liquid, keeping the gas and liquid separated by a flexible barrier. Many liquids impose few barrier design problems but certain liquids, especially liquid propellants for rocket engines, are so chemically reactive that the barrier design is quite critical.

Heretofore, a chemically inert barrier, such as a single diaphragm bladder across the equator of a spherical tank was used but this imposed problems. The disadvantages of this type of installation was that in one instance the tank had to be flanged to permit an opening to accept the diaphragm, and in another instance, where a one-piece tank was used, a bag type bladder had to be first fabricated, using forms that had to be destroyed, and then the bladder had to be folded and inserted within the tank.

In the first instance, where there was a need to provide for a two-piece tank, there was a problem of reinforcement of the tank. That is, extra material was needed since local stresses were present at the bolt area of the flanges. This necessitated the use of a heavier tank.

In the second instance, where it was necessary to construct the bladder before inserting into the tank, it was necessary to first construct the bladder, using some type of tooling equipment, and then installing the bladder after it had been constructed within a storage tank. This presented the problem in that not only did it necessitate additional tooling equipment to construct the bladder, but after fabrication it was necessary to fold the bladder to be inserted within its storage tank. This produced permanent creases within the bladder structure which were readily attacked by the propellant material and thus reduced the life span of the bladder.

In the construction of this type of a spherical bladder, a Teflon, polytetrafluorethylene, or equivalent chemically inactive material was sprayed on a thin walled sphere of an etchable metal. The metal was then dissolved with acid leaving the bladder. It was also necessary to provide the tank with a standpipe or other supporting and sealing devices to facilitate the expulsion of the bladder. This was a disadvantage because it necessitated additional tooling.

The next step in the assembling of this type of a spherical tank was when the bladder was folded and creased and then pushed through a port opening of a one-piece metal tank. This was a disadvantage because it presented the problem in that the bladder had to be permanently creased. This made the bladder vulnerable to the storage fuels at the creases.

If the flange metal sphere was used, some of this folding is eliminated, but as discussed before, heavier walled construction is need for the flanges producing a need for a heavier tank.

This invention provides a method for constructing a hemispherical bladder in the inner surface of a tank segment which is slightly larger than a hemisphere and which segment eventually is coupled with another tank segment which is slightly smaller than a hemisphere to combine therewith to form a spherical tank which results in a final storage container in which the bladder is used to separate the fuel from the pressure gas.

If a polytetrafluoroethylene or Teflon bladder is desired in a stainless steel tank, for example, bladder material such as polytetrafluoroethylene is sprayed onto the stainless steel tank hemispherical segment so that it may dry to form a bladder and then readily separated from the steel tank surface by the first application of a gas or a liquid forced in between the tank segment and the bladder. That is, the bladder is in contacting relation with the tank surface when it is formed, but it is free to be extended so that it may separate from the tank. More specifically, the bladder is so constructed that an epoxy capable of bonding the polytetrafluoroethylene material to the stainless steel tank is applied to a band extending just adjacent to the edge portion and the equator of the tank segment which is larger than a hemisphere before the polytetrafluoroethylene material is sprayed so that the bladder can be united at the equator of the spherical tank when it is finally assembled.

Therefore, it is an object of this invention to provide an improved method of forming a bladder within a tank which houses the final assembly of the bladder with the tank.

Another object of this invention is to provide an improved method of constructing a liquid storage tank having a highly efficient bladder construction, which bladder can be readily fabricated within one half of the spherical tank.

Still a further object of this invention is to provide a method of forming a bladder by spray coating bladder material, such as polytetrafluoroethylene, within a tank to form a bladder and that said bladder remain in said tank in which it is formed.

Still a further object of this invention is to provide a method of constructing a bladder as part of a thin wall metal tank without the need of a flange, and which bladder is permanently retained within the tank with fusion welding of one hemispherical segment of the tank to another hemispherical segment, to thereby form a completed enclosed spherical storage tank having two chambers separated by the bladder.

An additional object of this invention is to provide a method of assembling a bladder with a spherical tank, which bladder necessitated no prior creasing before it was assembled therein, therefore eliminating fatigue points due to creasing and thereby making the bladder less permeable to the fuel stored by said tank and thus increasing the storage life to give greater cycling capability to the bladder.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 1 is a sectional view of a disassembled form of the storage tank with the bladder fabricated therein in accordance with the method of this invention;

FIGURE 2 is an enlarged sectional view of a detailed portion of FIGURE 1; and

FIGURE 3 is a side view partly in section showing a complete assembly of the storage tank and the bladder in accordance with the method of the present invention, and with the bladder broken away from the internal portion of the storage tank.

The method of the present invention provides for a storage tank 10 having a one hemispherical segment 12 somewhat larger than a hemisphere and another semispherical segment 14 somewhat smaller than a hemisphere. The tank segment 12 has an annular edge 18 and there is attached, on its inner peripheral surface 19, at section 20 away from the equator 16 and toward the edge 18, a bladder 22. On the hemispherical tank segments 12 and 14 are welded a fluid pressure port 24 and a fluid outlet port 26 respectively.

In the construction of the storage tank 10, it is necessary to weld the pressure port 24 onto the hemispherical segment 12 before the installation of the bladder 22 onto the form 12. To accomplish the fabrication of the pressure port 24, a hole 30 is drilled substantially centrally of the segment 12. It should be noted that a port fitting 32 must be welded in place over the hole 30 of the tank form 12 before the bladder 22 is sprayed onto the form 12 otherwise excessive temperature, in welding the fitting 32 onto the segment 12, would melt the bladder 22.

In the spraying process of the bladder 12, as hereinafter more fully described, the hole 30 must be closed by a copper plug which later is removed by 50% nitric acid. The copper material of the plug must be very soft so that it may be forced within the hole 30 and then ground flat on the inside of the tank segment 12 for the bladder 22 to be evenly sprayed and thus prevent any irregularities at the plug area when the bladder dries. When the nitric acid is poured onto the copper plug, the acid attacks the copper but does not attack the tank or the bladder. When enough erosion has taken place on the copper plug, it may be removed to leave only the hole 30 and thereby permit intercommunication of a chamber 40 formed between the inside of the tank hemisphere 12 and the bladder 22 with the outside of the tank 10, as shown in FIGURE 3. A film of fluorocarbon may be placed over the copper plug on the inside of the tank before the bladder is sprayed over the plug. This will prevent any leakage of the spray through any holes that may have been formed between the copper plug and the hole 30.

Another method of preventing this spray of the bladder material to be ejected into the hole 30, is placing a thin copper disc against the hole on the inside of the tank. The copper disc may then be removed by the same process of using 50% nitric acid. When the disc is removed, it will leave a thin pocket between the tank and the sprayed bladder of polytetrafluoroethylene material at the hole 30 area. This air pocket will facilitate the release of the polytetrafluoroethylene bladder when the chamber is initially pressurized.

The construction of the bladder 22, within the hemispherical segment 12, is performed by first applying a ribbon 42 of epoxy material, capable of bonding the material of polytetrafluoroethylene or Teflon to stainless steel, just between the equator 16 and the edge 18 of the hemisphere segment 12. The epoxy ribbon 42 and the remaining inside area of the stainless steel tank is then sprayed with the polytetrafluoroethylene material to a desired thickness. The sprayed polytetrafluoroethylene material is then baked to form a continuous polytetrafluoroethylene coating to produce the hemisphere bladder 22. The bladder 22 will remain fixed to the tank hemisphere 12 in the area where the epoxy was applied. The bladder will thereby be permitted to pivot about an equatorial plane when pressure gas is applied through the port 24, as shown in FIGURE 3, to expand and expel the propellant out of a chamber 43 through the port 26. It should be noted that the coating of the polytetrafluoroethylene material presents a bladder 22 capable of positive expulsion for separating the chamber 40 in which the pressure gas is inserted and chamber 43 in which is carried the liquid propellant or other desired liquid.

It should be noted when the bladder 22 is pressurized for the first time, it will separate readily but not easily from the inside wall surface of the hemisphere segment 12. It will "peel" off the metal surface of the segment 12 because there is a somewhat surface bond between spray coating of the polytetrafluoroethylene material and the hemisphere wall surface due to the interlocking of sprayed particles and surface roughness of the steel. This problem may be somewhat eliminated by highly polishing the steel surface or painting the bladder area of the hemisphere with a release material prior to the spray coating. Any compatible, nongassing, die-coating material will do the job.

As best shown in FIGURE 2, the hemisphere segment 12 is provided with a lipped edge 44 which mates with a complementary lipped edge 46 of the hemisphere segment 14. This permits proper alignment of the two hemispheres 12 and 14 and thereby permits them to be mated before welding the two hemispheres 12 and 14. The configuration of the edges 44 and 46 is similar to a lap joint.

After uniting the hemisphere segment 14 to the hemisphere segment 12, as shown in FIGURE 3, the segments are welded along their mating edges 46 and 44 by fusion welding, also known as the "electron beam welding process." This process has a definite advantage in the fabrication of the two hemispheres in that the parts welded by fusion of liquid metal from the mating edges eliminates the need for a welding rod. In addition, this process can be used with thin walled material wherein negligible heat transfer from the weld area to the bladder area is produced. This assures that the bladder 22 will remain effective during the closing of the storage tank. The fusion weld may penetrate to a depth of 90% of the wall thickness of the tank to insure that no molten metal will fall inside the spherical form of the tank or produce rough edges on the inside surface of the tank. In addition, it can be seen that the lip-type configuration of the small and large hemispherical segments 14 and 12 act as a dam to inhibit the flow of the molten metal, in the radial direction of the tank, during welding.

In summary, therefore, it should be noted that the formation of the bladder 22 in the tank 10 is a new approach to the fabrication of this type of a storage tank which eliminates many tooling costs. In addition, it should be noted that the method of spraying the polytetrafluoroethylene coating, in forming the bladder 22, can be applied to a variety of materials in the same manner as hereinbefore described. The fusion welding allows for the use of thin wall construction for the tank because no flange is needed and also insures that the bladder is not damaged by any protrusion or deformation of the inside tank configuration. Furthermore, it should be noted that no creases are made on the bladder and therefore prevents any fatigue points which might be formed by the need for creasing the bladder before it is inserted within a one-piece storage tank. This makes the bladder less permeable to the fuel it contains and thereby increase the storage life and thereby provides a greater number of expulsion cycles.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

We claim:
1. A method of fabricating and assembling a tank for storage and expulsion of a fluid, said tank being of a type including a pair of segments, and said segments providing a pair of opposed forms having substantially similar annular edges; the steps comprising applying bonding material at an inner periphery of one of the segments, spraying bladder material on the bonding material and inner surface of said one segment, curing said bladder material on the inner surface of said one segment for forming a flexible bladder within said one segment, bonding said bladder upon the curing thereof at the periphery of said one segment by said bonding material, providing an aperture in said one segment opening at the inner surface of said one segment and at an underside of said flexible bladder within said inner periphery of said one segment, applying a fluid pressure medium through said aperture in said one segment to cause the flexible bladder to separate from the peripheral surface of the one segment while remaining bonded by the bonding material to the inner periphery of the one segment, and securing the pair of segments together at the annular edges thereof for producing two chambers separable by said bladder.

2. A method of fabricating and assembling a tank for storage and expulsion of a fluid, as defined by claim 1, including the steps of applying a ribbon of epoxy bonding material along the inner periphery of said one segment, spraying a polytetrafluoroethylene bladder material on the bonding material and inner surface of said one segment, and the further step of curing said bladder material on the inner peripheral surface of said one segment and in a bonded relation to the ribbon of epoxy material at the periphery of said one segment.

3. A method of fabricating and assembling a tank for storage and expulsion of fluid, as defined by claim 2, including the step of drilling a hole in the one segment and in a substantially central location in said one segment, temporarily closing the hole with a removable material prior to the step of spraying the polytetrafluoroethylene bladder material on the inner surface of said one segment, removing the removable material from the hole after the curing of said bladder material on the inner surface of said one segment, and thereafter applying a pressurized gas through the centrally located hole in the one segment to cause the bladder material to separate from the peripheral surface of the one segment while remaining bonded by the ribbon of epoxy material to the inner periphery of the one segment.

References Cited
UNITED STATES PATENTS

| | | | |
|---|---|---|---|
| 2,731,297 | 1/1956 | Meyer. | |
| 2,833,667 | 5/1958 | Dalton | 117—96 X |
| 2,984,392 | 5/1961 | Wadenby | 222—176 X |
| 3,037,497 | 6/1962 | Roberson | 222—386.5 X |
| 3,067,078 | 12/1962 | Gluck | 156—330 X |
| 3,229,014 | 1/1966 | Petriello. | |
| 3,241,722 | 3/1966 | Nissen | 222—386.5 X |
| 3,347,966 | 10/1967 | Seefluth | 264—335 X |

EARL M. BERGERT, Primary Examiner

R. A. KILLWORTH, Assistant Examiner

U.S. Cl. X.R.

117—97; 156—228; 222—386.5; 264—335